United States Patent
Sarikaya et al.

(10) Patent No.: US 9,412,363 B2
(45) Date of Patent: Aug. 9, 2016

(54) MODEL BASED APPROACH FOR ON-SCREEN ITEM SELECTION AND DISAMBIGUATION

(71) Applicant: Microsoft Technology Licensing, LLC, Redmond, WA (US)

(72) Inventors: Ruhi Sarikaya, Redmond, WA (US); Fethiye Asli Celikyilmaz, Mountain View, CA (US); Zhaleh Feizollahi, Belleview, WA (US); Larry Paul Heck, Los Altos, CA (US); Dilek Z. Hakkani-Tur, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 92 days.

(21) Appl. No.: 14/194,964

(22) Filed: Mar. 3, 2014

(65) Prior Publication Data
US 2015/0248886 A1    Sep. 3, 2015

(51) Int. Cl.
*G10L 15/18* (2013.01)
*G06F 3/16* (2006.01)
*G06F 17/30* (2006.01)
*G10L 15/00* (2013.01)

(52) U.S. Cl.
CPC ............ *G10L 15/1815* (2013.01); *G06F 3/167* (2013.01); *G06F 17/30654* (2013.01); *G10L 15/00* (2013.01)

(58) Field of Classification Search
CPC ....... G10L 15/22; G10L 15/063; G10L 15/18; G10L 15/1815; G10L 15/19; G10L 15/30; G09B 19/04
USPC .............. 704/235, 257, 276, 251, 270, 270.1; 725/53
See application file for complete search history.

(56) References Cited

U.S. PATENT DOCUMENTS

| 6,085,160 A | 7/2000 | D'hoore et al. |
| 6,711,543 B2 | 3/2004 | Cameron |
| 6,757,718 B1 | 6/2004 | Halverson et al. |

(Continued)

FOREIGN PATENT DOCUMENTS

| EP | 2533242 A1 | 12/2012 |
| WO | WO 0225637 | 3/2002 |
| WO | WO 2014057140 | 4/2014 |

OTHER PUBLICATIONS

Gorniak, et al., "Augmenting User Interfaces with Adaptive Speech Commands", In Proceedings of International Conference on Multimodal Interfaces, Nov. 5, 2005, 4 pages.

(Continued)

*Primary Examiner* — Charlotte M Baker
(74) *Attorney, Agent, or Firm* — Tom Wong; Steven Spellman; Micky Minhas

(57) ABSTRACT

A model-based approach for on-screen item selection and disambiguation is provided. An utterance may be received by a computing device in response to a display of a list of items for selection on a display screen. A disambiguation model may then be applied to the utterance. The disambiguation model may be utilized to determine whether the utterance is directed to at least one of the list of displayed items, extract referential features from the utterance and identify an item from the list corresponding to the utterance, based on the extracted referential features. The computing device may then perform an action which includes selecting the identified item associated with utterance.

20 Claims, 10 Drawing Sheets

(56) References Cited

U.S. PATENT DOCUMENTS

| | | | |
|---|---|---|---|
| 7,167,826 | B2 | 1/2007 | Cho |
| 7,742,911 | B2 | 6/2010 | Chotimongkol et al. |
| 7,844,458 | B2 | 11/2010 | Hirota et al. |
| 7,881,493 | B1 | 2/2011 | Edwards et al. |
| 7,933,508 | B2 | 4/2011 | Konicek |
| 8,112,275 | B2 | 2/2012 | Kennewick et al. |
| 8,224,656 | B2 * | 7/2012 | Scholz et al. ............... 704/276 |
| 8,296,383 | B2 | 10/2012 | Lindahl |
| 8,375,326 | B2 | 2/2013 | Bucher et al. |
| 8,467,672 | B2 | 6/2013 | Konicek |
| 8,560,321 | B1 | 10/2013 | Yeracaris et al. |
| 8,571,851 | B1 | 10/2013 | Tickner et al. |
| 8,700,392 | B1 | 4/2014 | Hart et al. |
| 8,793,620 | B2 | 7/2014 | Stafford |
| 8,818,804 | B2 | 8/2014 | Jordan et al. |
| 8,977,555 | B2 | 3/2015 | Torok et al. |
| 9,043,206 | B2 | 5/2015 | Roberge |
| 2002/0120455 | A1 | 8/2002 | Nakata |
| 2002/0135618 | A1 | 9/2002 | Maes et al. |
| 2003/0040914 | A1 | 2/2003 | Friedrich et al. |
| 2010/0033333 | A1 | 2/2010 | Victor et al. |
| 2010/0312547 | A1 | 12/2010 | Van et al. |
| 2011/0029301 | A1 | 2/2011 | Han et al. |
| 2011/0054899 | A1 | 3/2011 | Phillips et al. |
| 2011/0276944 | A1 | 11/2011 | Bergman et al. |
| 2012/0209608 | A1 | 8/2012 | Lee |
| 2012/0253788 | A1 | 10/2012 | Heck et al. |
| 2012/0254227 | A1 | 10/2012 | Heck et al. |
| 2012/0259638 | A1 | 10/2012 | Kalinli |
| 2012/0295708 | A1 | 11/2012 | Hernandez-Abrego et al. |
| 2013/0187835 | A1 | 7/2013 | Vaught et al. |
| 2013/0304479 | A1 | 11/2013 | Teller et al. |
| 2013/0307771 | A1 | 11/2013 | Parker et al. |
| 2013/0346085 | A1 | 12/2013 | Stekkelpak |
| 2014/0099623 | A1 | 4/2014 | Amit et al. |
| 2014/0184550 | A1 | 7/2014 | Hennessey et al. |
| 2014/0196092 | A1 * | 7/2014 | Chung ............... G10L 15/26 725/53 |
| 2014/0337740 | A1 | 11/2014 | Kwon et al. |
| 2016/0091967 | A1 | 3/2016 | Prokofieva et al. |

OTHER PUBLICATIONS

Hui, et al., "Cross-Modality Semantic Integration With Hypothesis Rescoring for Robust Interpretation of Multimodal User Interactions", IEEE Transactions on Audio, Speech and Language Processing, vol. 17, Issue 3, Mar. 2009, pp. 486-500.
"International Search Report and Written Opinion Issued in PCT Patent Application No. PCT/US2015/017874", Mailed Date: Jul. 7, 2015, 11 Pages.
"Use Speech Recognition to click anywhere on the screen", Retrieved on: Oct. 6, 2015, Available at: http://windows.microsoft.com/en-SG/windows-vista/Use-Speech-Recognition-to-click-anywhere-on-the-screen?6416ca60, 2 pgs.
Bolt, Richard A., "Put-that-there: Voice and Gesture at the Graphics Interface", In Proceedings of the 7th annual conference on Computer graphics and interactive techniques, Jul. 14, 1980, 9 pages.
Celikyilmaz, Asli, et al., "A Universal Model for Flexible Item Selection in Conversational Dialogs", Dec. 2015, 7 pgs.
Chen, et al., "Probabilistic Gaze Estimation Without Active Personal Calibration" Dept. of Electrical, Computer and System Engineering Rensselaer Polytechnic Institute, 8 pages.
Cooke, et al., "Exploiting a 'Gaze-Lombard Effect' to Improve ASR Performance in Acoustically Noisy Settings", In IEEE International Conference on Acoustics, Speech and Signal Processing, May 4, 2014, 5 pages.
Deng, et al., "Recent Advances in Deep Learning for Speech Research at Microsoft", In IEEE International Conference on Acoustics, Speech and Signal Processing, May 26, 2013, 5 pages.
Griffin, et al., "What the Eyes Say about Speaking", In Proceedings of Psychological Science, vol. 11, No. 04, Jul. 2000, 6 pages.
Griffin, Zenzi M., "Gaze Durations during Speech Reflect Word Selection and Phonological Encoding", In Proceedings of Cognition, vol. 82, No. 1, Nov. 2001, 14 pages.
Heck, et al., "Multi-Modal Conversational Search and Browse", In Proceedings of the First Workshop on Speech, Language and Audio in Multimedia, Aug. 22, 2013, 6 pages.
Icsiboost, Retrieved on: Sep. 9, 2014, Available at: https://code.google.com/p/icsiboost, 2 pgs.
Kaur, et al., "Where is it? Event Synchronization in Gaze-Speech Input Systems", In Proceedings of the 5th international conference on Multimodal interfaces, Nov. 5, 2003, 8 pages.
Kennington, et al., "Interpreting Situated Dialogue Utterances: An Update Model that Uses Speech, Gaze, and Gesture Information", In Proceedings of 14th Annual SIGdial Meeting on Discourse and Dialogue, Aug. 22, 2013, 10 pages.
Kluwer, et al., "Using Syntactic and Semantic based Relations for Dialogue Act Recognition", In Proceedings of 23rd International Conference on Computational Linguistics, Aug. 2010, pp. 570-578.
Kulkarni, et al., "Mutual Disambiguation of Eye Gaze and Speech for Sight Translation and Reading", In Proceedings of the 6th Workshop on Eye Gaze in Intelligent Human Machine Interaction, Dec. 13, 2013, 6 pages.
Latif, et al., "Teleoperation through Eye Gaze (TeleGaze): A Multimodal Approach", In IEEE International Conference on Robotics and Biomimetics, Dec. 19, 2009, 6 pages.
Misu, et al., "Situated Multi-Modal Dialog System in Vehicles", In Proceedings of the 6th workshop on Eye gaze in intelligent human machine interaction: gaze in multimodal interaction, Dec. 13, 2013, 3 pages.
PCT International Search Report and Written Opinion for PCT Application No. PCT/US2015/052194, mailed Nov. 9, 2015, 13 pages.
Prasov, et al., "Eye Gaze for Attention Prediction in Multimodal Human-Machine Conversation", In Technical Report SS-07-04, Mar. 26, 2007, 9 pages.
Prasov, et al., "Fusing Eye Gaze with Speech Recognition Hypotheses to Resolve Exophoric References in Situated Dialogue", In Proceedings of the Conference on Empirical Methods in Natural Language Processing, Oct. 9, 2010,11 Pages.
Prasov, et al., "What's in a gaze?: the role of eye-gaze in reference resolution in multimodal conversational interfaces", In Proceedings of the 8 International Conference on Intelligent User Interfaces, Jan. 13, 2008, 10 pages.
Qu, et al., "The Role of Interactivity in Human-Machine Conversation for Automatic Word Acquisition", In the Proceedings of 10th Annual Meeting of the Special Interest Group in Discourse and Dialogue, Sep. 2009, 8 pages.
Qvarfordt, et al., "Conversing with the User Based on Eye-Gaze Patterns", In Proceedings of the SIGCHI Conference on Human Factors in Computing Systems, Apr. 2, 2005, 10 pages.
Qvarfordt, et al., "Realtourist—A Study of Augmenting Human-Human and Human-Computer Dialogue with Eye-Gaze Overlay", In International Conference on Human-Computer Interaction, Sep. 12, 2005, 14 pages.
Salvucci, et al., "Identifying Fixations and Saccades in Eye-Tracking protocols", In Proceedings of symposium on Eye tracking research & applications, Nov. 8, 2000, 8 pages.
Slaney, et al., "Gaze-Enhanced Speech Recognition", In IEEE International Conference on Acoustics, Speech and Signal Processing, May 4, 2014, 5 pgs.
Tan, et al., "Eye Gaze and Speech for Data Entry: A Comparison of Different Data Entry Methods", In International Conference on Multimedia and Expo, Jul. 6, 2003, 4 pages.
Vosoughi, Soroush, "Improving Automatic Speech Recognition Through Head Pose Driven Visual Grounding", Published on: Apr. 26, 2014, Available at: http://www.media.mit.edu/cogmac/publications/CHI2014_vosoughi.pdf, 4 pgs.
Zhang, et al., "Designing a Robust Speech and Gaze Multimodal System for Diverse Users", In IEEE International Conference on Information Reuse and Integration, Oct. 27, 2003, 8 pages.
PCT 2nd Written Opinion Issued in PCT Patent Application No. PCT/US2015/017874, mailed Feb. 12, 2016, 8 pgs.
U.S. Appl. No. 14/496,538, Office Action mailed Feb. 18, 2016, 29 pgs.
U.S. Appl. No. 14/496,538, Amendment and Response filed Apr. 25, 2016, 20 pgs.

* cited by examiner

MODEL BASED APPROACH FOR ON-SCREEN ITEM SELECTION AND DISAMBIGUATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Many computing devices, such as smartphones, desktops, laptops, tablets, game consoles, televisions, and the like, include functionality for receiving an input (e.g., voice input) for identifying and selecting items displayed on a screen. For example, a user interacting with an entertainment search application executing on a computing device may wish to request the display of movie titles which share a common theme (e.g., HARRY POTTER movies) or a list of restaurants sharing a common attribute (e.g., middle eastern cuisine). Current applications however, focus on rule-based grammars that cover a very strict set of language constructs comprising a limited number of acceptable commands. Thus, the user often does not know which commands would work (i.e., what the application can handle) and which will not, leading to a time-consuming trial and error approach. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide a model based approach for on-screen item selection and disambiguation. An utterance may be received by a computing device in response to displaying items on a display. A disambiguation model may then be applied to the utterance by the computing device. The disambiguation model may be utilized for identifying whether the utterance is directed to at least one of the items on the display, extracting referential features from the utterance and identifying an item among the displayed items corresponding to the utterance, based on the extracted referential features. The computing device may then perform an action associated with the utterance upon identifying the item corresponding to the utterance on the display.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments provide a model based approach for on-screen item selection and disambiguation. An utterance may be received by a computing device in response to displaying items on a display. A disambiguation model may then be applied to the utterance by the computing device. The disambiguation model may be utilized for identifying whether the utterance is directed to at least one of the items on the display, extracting referential features from the utterance and identifying an item among the displayed items corresponding to the utterance, based on the extracted referential features. The computing device may then perform an action associated with the utterance upon identifying the item corresponding to the utterance on the display.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
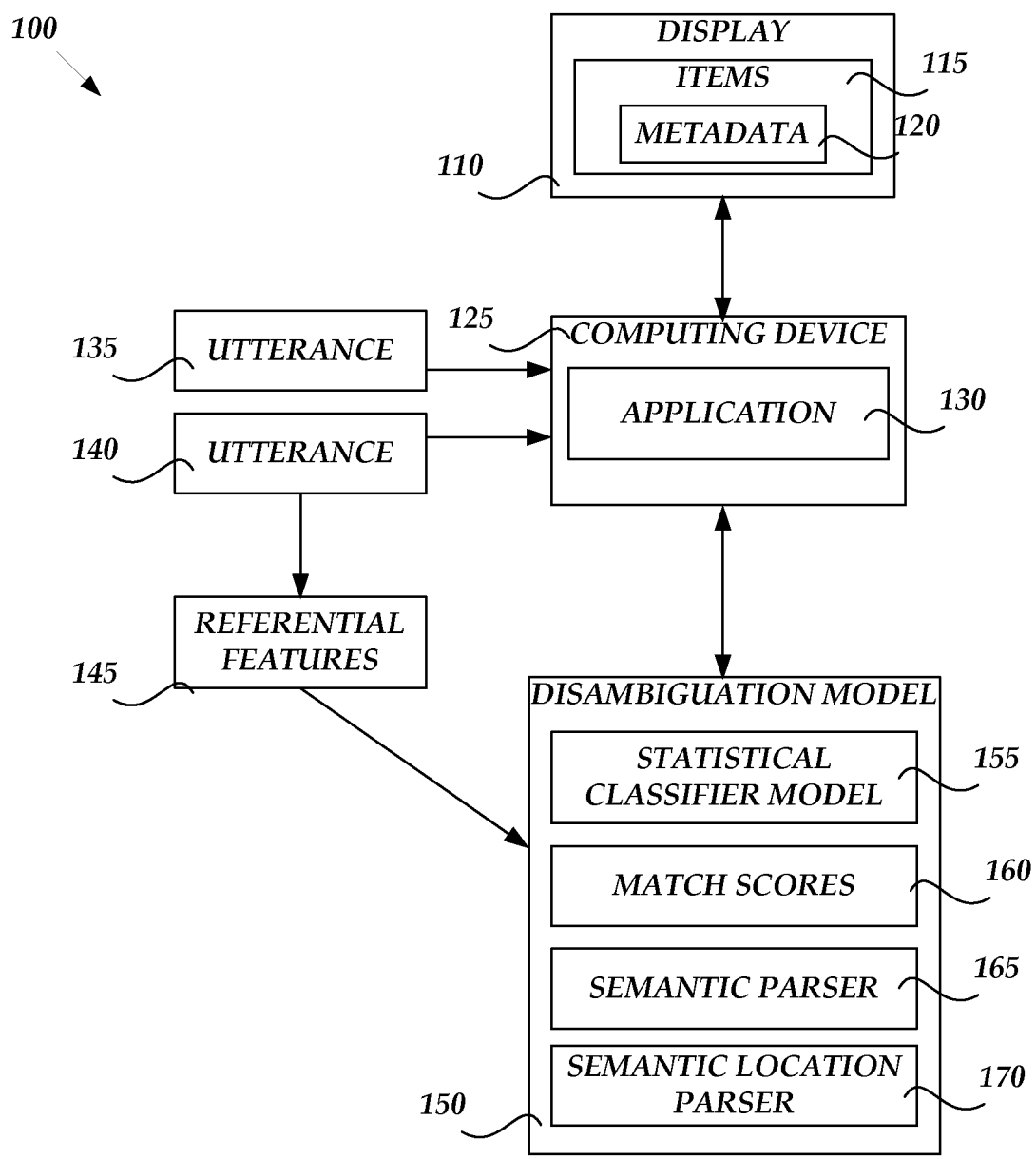
FIG. 1 is a block diagram illustrating a system which utilizes a model based approach for on-screen item selection and disambiguation, in accordance with an embodiment.

Referring now to the drawings, in which like numerals represent like elements through the several figures, various aspects of the present invention will be described. FIG. 1 is a block diagram illustrating a system 100 which utilizes a model based approach for on-screen item selection and disambiguation, in accordance with an embodiment. The system 100, which may comprise a conversational dialog system, includes a computing device 125 which is in communication with a display 110 (it should be understood that the display 110 may be integrated with the computing device 125 or comprise a separate device connected to the computing device 125, in accordance with various embodiments). In accordance with various embodiments, the computing device 125 may comprise, without limitation, a desktop computer, laptop computer, smartphone, video game console or a television. The computing device 125 may also comprise or be in communication with one or more recording devices (not shown) used to detect speech and receive video/pictures (e.g., MICROSOFT KINECT, microphone(s), and the like).

The computing device 125 may store an application 130 which, as will be described in greater detail below, may be configured to receive utterances 135 and 140 from a user in the form of natural language queries to select items 115 which may be shown on the display 110. Each of the items 115 may further comprise metadata 120 which may include additional item data such as text descriptions (e.g., a synopsis of a movie item, year of publication, actors, genre, etc.). For example, the application 130 may be configured to display a user interface for querying a list of movies based on a common character (e.g., "HARRY POTTER" movies) or a list of restaurants based in a particular area of a city or town (e.g., restaurants located in northeast Bellevue, Wash.), and then making a desired selection therefrom. Utterances comprising natural language queries for other items corresponding to other categories (e.g., a contacts list, music, television programs, etc.) may also be received and displayed utilizing the application 130.

As will further be described in greater detail below, the application 130 may also be configured to generate a disambiguation model 150 for receiving referential features 145 (which may include explicit descriptive references, implicit descriptive references, explicit spatial or positional references and implicit spatial or positional references) associated with utterance 140. The disambiguation model 150 may include various sub-models and program modules, including statistical classifier model 155, match scores module 160, semantic parser 165 and semantic location parser 170. The disambiguation model 150 may utilize the aforementioned sub-models and program modules to determine if there is a relationship between a displayed item 115 and the utterance 140 so that the disambiguation model 150 may correctly identify utterances directed to the display 110 of the computing device 125 and choose the correct item in response to a user query. In accordance with an embodiment, the application 130 may comprise an operating system such as the WINDOWS PHONE and XBOX OS operating systems from MICROSOFT CORPORATION of Redmond Wash. It should be understood, however, that other operating systems and applications (including those from other manufacturers) may alternatively be utilized in accordance with the various embodiments described herein.

Figure 2A:
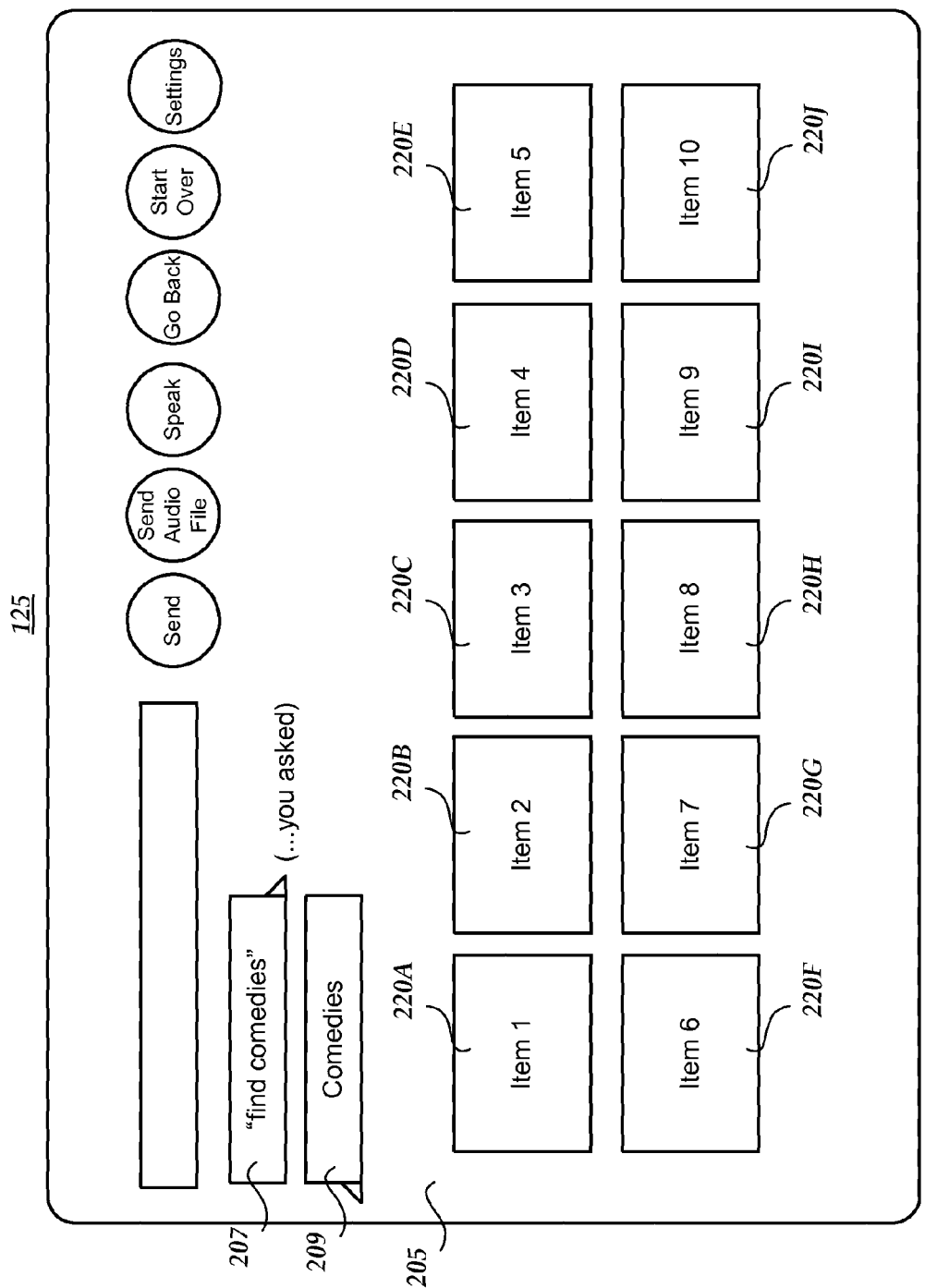
FIG. 2A shows a screen display of a computing device which includes a user interface for utilizing a model based approach for on-screen item selection and disambiguation, in accordance with an embodiment.

FIG. 2A shows a screen display of the computing device 125 which includes a user interface 205 for utilizing a model based approach for on-screen item selection and disambiguation, in accordance with an embodiment. The user interface 205, which may be generated by the application 130 on the display 110, may be configured for a user to interact with the computing device 125 to complete several tasks such as browsing, searching, filtering, etc. The user interface 205 may include a first turn or first utterance 207 and a recognition result 209. The first turn utterance 207 may comprise a query posed by a user for a list of items (e.g., "find comedies"), after which the application 30 may return a list of items 220A-220J for the user to choose from, which are shown on the display 110. As discussed above with respect to FIG. 1, each of the items 220A-220J may include accompanying text (e.g., titles of movie comedies) in addition to metadata (not shown to the user) which may include additional information about each item.

Figure 2B:
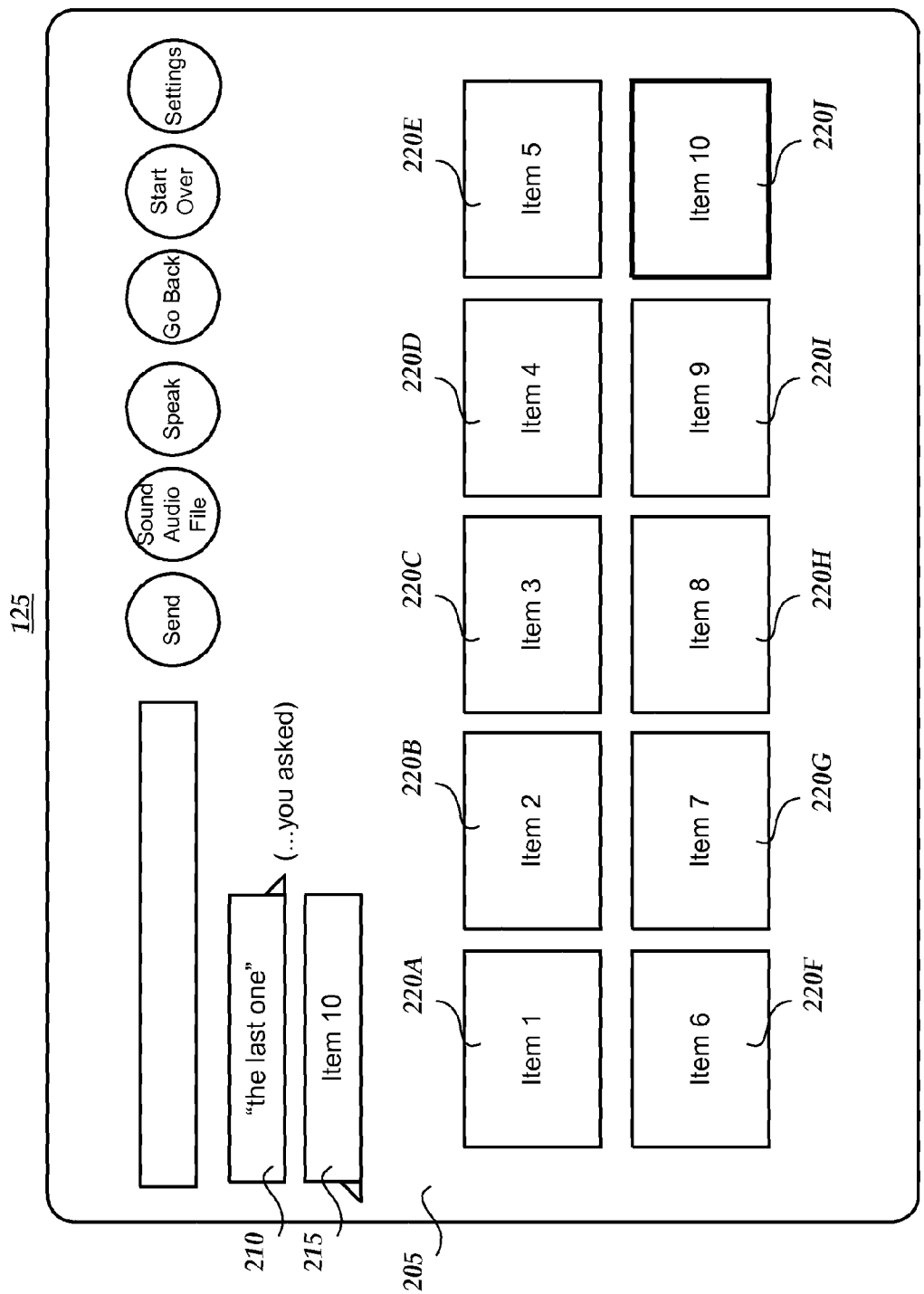
FIG. 2B shows a screen display of a computing device which includes a user interface for utilizing a model based approach for on-screen item selection and disambiguation, in accordance with an embodiment.

FIG. 2B shows a screen display of the computing device 125 which includes the user interface 205 for utilizing a model based approach for on-screen item selection and disambiguation, in accordance with an embodiment. The user interface 205, which may be generated by the application 130 after displaying the items 220A-220J in response to receiving the first utterance 207 (as shown in FIG. 2A), may include a second turn or second utterance 210 and a recognition result 215. As will be discussed in greater detail below with respect to FIGS. 4-5, the recognition result 215 may be determined by applying the disambiguation model 150 to the second utterance 210 in order to identify the correct item requested by the user (e.g., the "last one") from among the displayed items 220A-220J (e.g., "Item 10"). Once an item has been identified, the item may then be highlighted (such as shown surrounding the item 320J) for selection or other action by the user.

Figure 3:
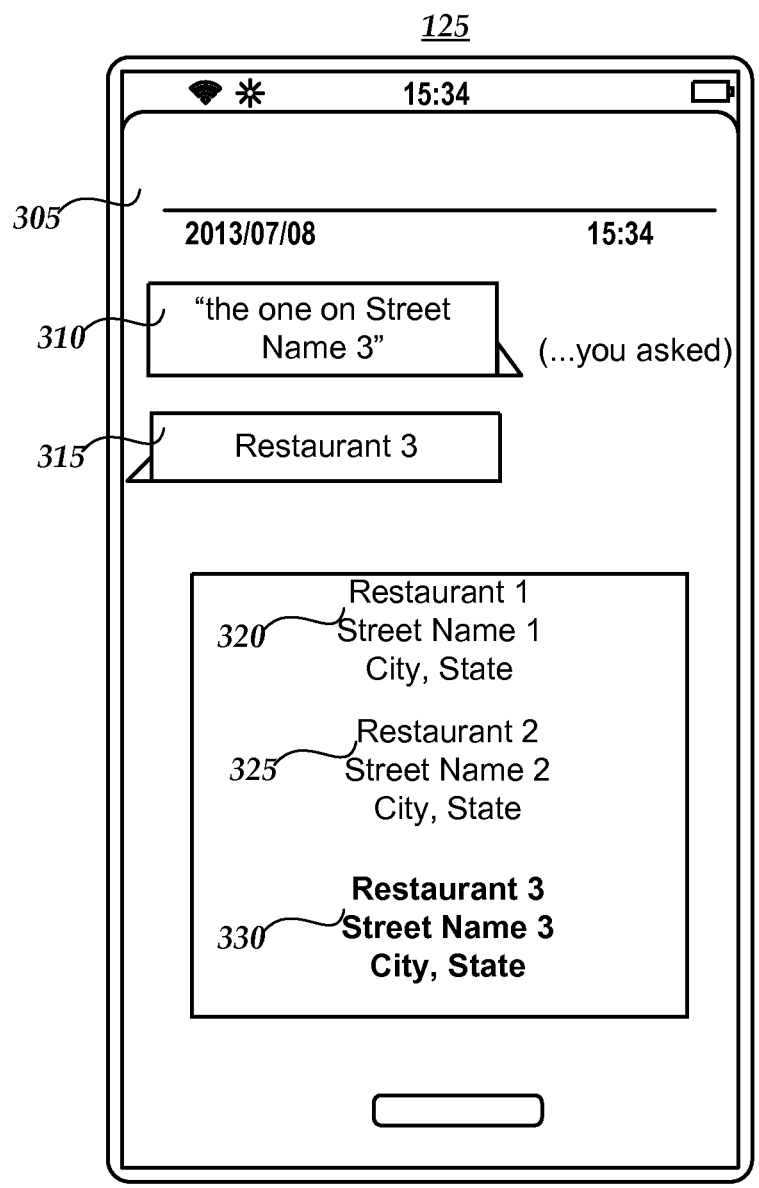
FIG. 3 shows a screen display of a computing device which includes a user interface for utilizing a model based approach for on-screen item selection and disambiguation, in accordance with an embodiment.

FIG. 3 shows a screen display of the computing device 125 which includes a user interface 305 for utilizing a model based approach for on-screen item selection and disambiguation, in accordance with another embodiment. The user interface 305, which may be generated by the application 130 on the display 110, may be configured for a user to interact with the computing device 125 to complete several tasks such as browsing, searching, filtering, etc. The user interface 305 may include an utterance 310 and a recognition result 315. As will be discussed in greater detail below with respect to FIGS. 4-5, the recognition result 315 may be determined by applying the disambiguation model 150 to the utterance 315 in order to identify the correct item requested by the user (e.g., "the one on Street Name 3") from among displayed items 320-330. Once an item has been identified, the item may then be highlighted (such as shown applied to the item 330) for selection or other action by the user.

Figure 4:
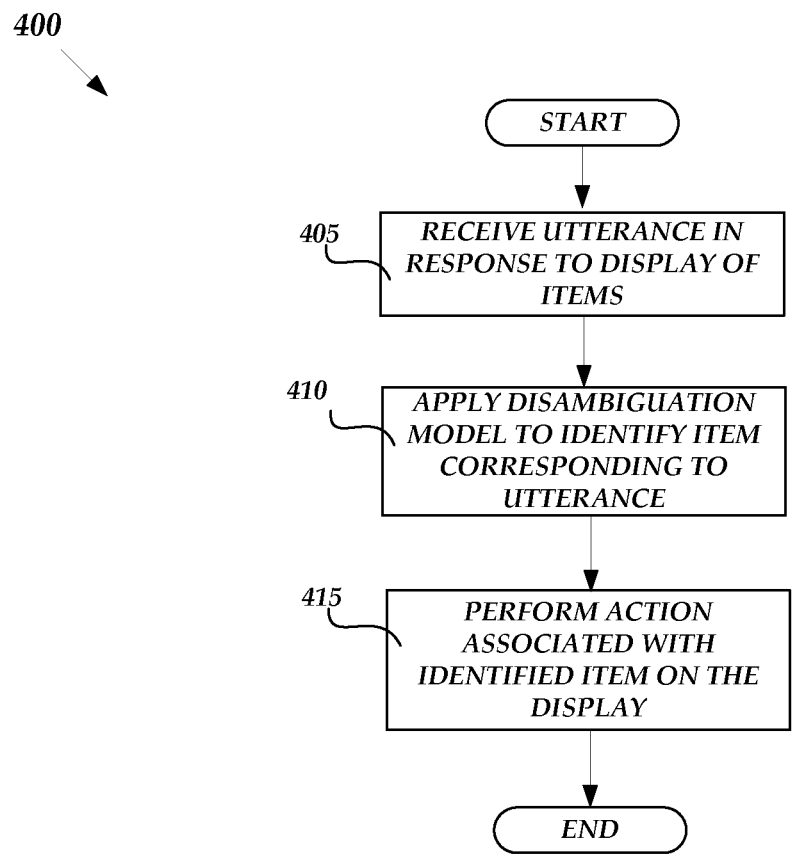
FIG. 4 is a flow diagram illustrating a routine for utilizing a model based approach for on-screen item selection and disambiguation, in accordance with an embodiment.

FIG. 4 is a flow diagram illustrating a routine 400 utilizing a model based approach for on-screen item selection and disambiguation, in accordance with an embodiment. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIGS. 4-5 and making up the various embodiments described herein are referred to variously as operations, structural devices, acts or modules. It will be recognized by one skilled in the art that these operations, structural devices, acts and modules may be implemented in software, in hardware, in firmware, in special purpose digital logic, and any combination thereof without deviating from the spirit and scope of the present invention as recited within the claims set forth herein.

The routine 400 begins at operation 405, where the application 130 executing on the computing device 125, may receive an utterance (from a user) in response to a display of items on the display 110.

From operation 405, the routine 400 continues to operation 410, where the application 130 executing on the computing device 125, may apply the disambiguation model 150 to identify a displayed item corresponding to the utterance received at operation 405. It should be understood that in accordance with one embodiment, a single model (e.g., the disambiguation model 150) may be utilized to implement a two-stage process to: (1) identify whether the user is referring to an item on the display 110 and, if so, (2) determine which item the user is referring. In accordance with an alternative embodiment, multiple models (e.g., two separate models) may be utilized to implement the aforementioned two stage process. For example, a first model may be utilized to identify whether the user is referring to an item on the display 110 and a second model may be utilized to determine which item the user is referring. Illustrative operations performed by the disambiguation model 150 for identifying a displayed item corresponding to the utterance will be described in greater detail below with respect to FIG. 5.

From operation 410, the routine 400 continues to operation 415, where the application 130 executing on the computing device 125, may perform an action (or actions) associated with the item identified on the display 110 by the disambiguation model 150. For example, in one embodiment, the action may include the user selection of the disambiguated item on the display 110 for viewing additional information about the selected item (e.g., additional information about a selected movie title). In another embodiment, an action may include the user selection of the disambiguated item on the display and the execution of an activity associated with the selected item. The activity may include, for example, playing a selected movie, displaying directions to a selected restaurant location, generating an e-mail to a selected contact from a contacts list, etc. From operation 415, the routine 400 then ends.

Figure 5:
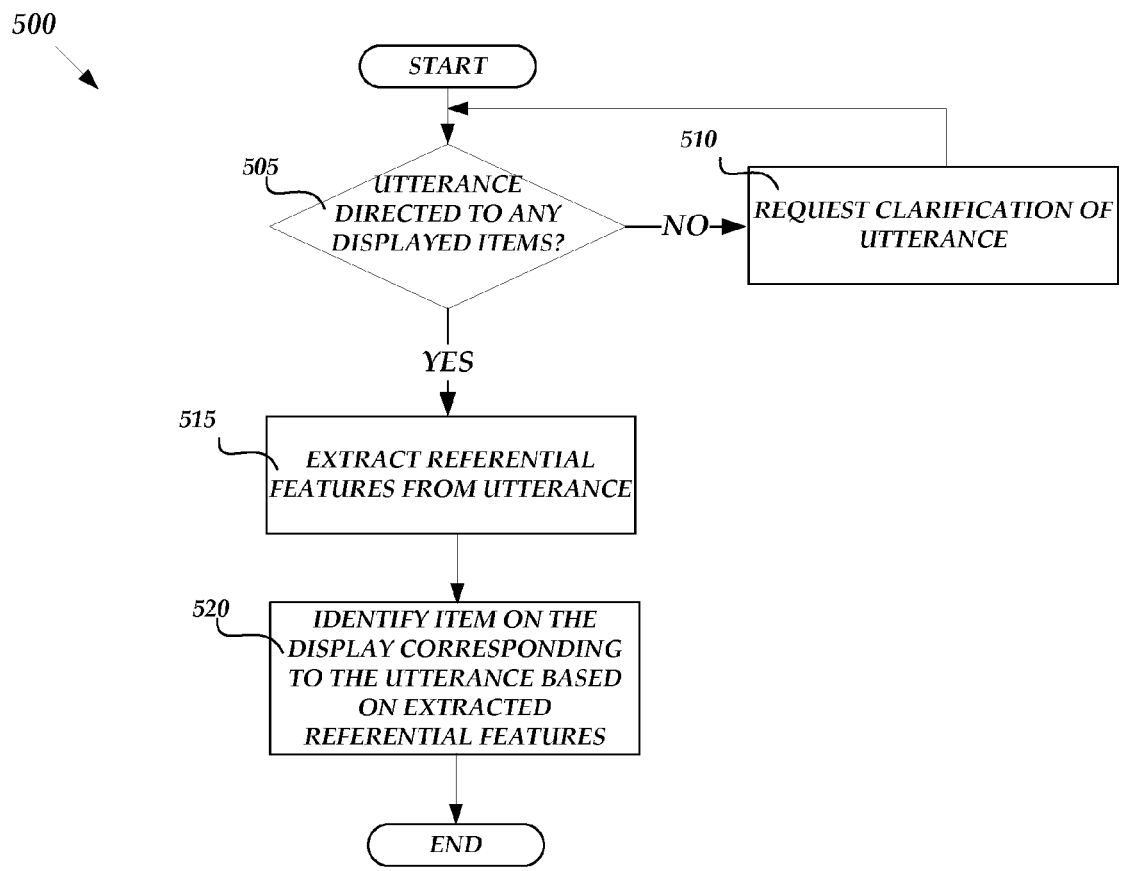
FIG. 5 is a flow diagram illustrating a routine for utilizing a model based approach for on-screen item selection and disambiguation, in accordance with an embodiment.

FIG. 5 is a flow diagram illustrating a routine 500 utilizing a model based approach for on-screen item selection and disambiguation, in accordance with an embodiment. The routine 500 begins at operation 505, where the disambiguation model 150 (generated by the application 130) may determine if the utterance received at operation 405 of FIG. 4 is directed to any items displayed on the display 110. In particular, the disambiguation model 150 may be configured to build and apply the statistical classifier model 155 to the utterance. In one embodiment, the statistical classifier model 155 may include lexical and semantic features. The lexical and semantic features may include a vocabulary obtained from text in the utterance, a phrase match between the utterance and item metadata associated with the items on the display 110, and locational features (e.g., "top," "second one," etc.). If, at operation 505, the disambiguation model 150 determines that the utterance is directed to at least one of the items displayed on the display 110, then the routine 500 branches to operation 515. If, at operation 505, the disambiguation model 150 is unable to determine that the utterance is directed to any of the displayed items on the display 110 (e.g., there is not a phrase match between the utterance and any of the metadata for the displayed items), then the routine 500 continues to operation 510.

At operation 510, the application 130 may be configured to request a clarification of the received utterance. For example, the requested clarification may include returning a "no results" message followed by a request to restate the utterance. From operation 510, the routine 500 returns to operation 505.

At operation 515, the disambiguation model 150 may extract referential features from the utterance. In particular, the disambiguation model 150 may be configured to extract semantic and syntactic features by considering different types of utterances (or utterance classes). In one embodiment, the utterance classes may include: (1) Explicit Referential (i.e., explicit mentions of a whole or part of a title, or other textual cues such as underline text (e.g., show me the details of the empty chair" when referring to a book title)); (2) Implicit Referential (i.e., an implicit referral of an item using information related to the item such as the name of an author or item image (e.g., "the one released in 2005")); (3) Explicit Positional (i.e., a positional reference or screen location data using information from a list of items displayed as a grid (e.g., "I want to watch the movie on the bottom right corner")); and (4) Implicit Positional (i.e., positional references in relation to one item on the display (e.g., "the second of the director's movies" for two displayed movie items by the same director on the same row)).

From operation 515, the routine 500 continues to operation 520, where the disambiguation model 150 may identify an item on the display 110 corresponding to the utterance based on the extracted referential features at operation 515. In particular, the disambiguation model 150 may be configured to identify one or more explicit and implicit references in the utterance, determine lexical match scores between the utterance and metadata associated with each of the displayed items, parse the utterance for matching phrases between semantic phrases in the utterance and the metadata, and parse the utterance to capture location indicators for predicting a screen location of the item. For example, the lexical match scores may be based on an n-gram match based on word overlap, word order, Jaccard-sentence similarity, etc. In one embodiment, if the lexical match score for an utterance-item pair is above a threshold, then the disambiguation model 150 may determine that item corresponds to the utterance made by the user. It should be understood, that in accordance with an embodiment, the disambiguation model 150 may utilize the semantic parser 165 (which may comprise a natural language understanding model) to decode the utterance into semantic tags such as movie-name, actor-name, or descriptions such as movie or game genre or description. The disambiguation model 150 may then look for matching phrases between the semantic phrases in the utterance and an item's metadata. It should be further understood, that in accordance with an embodiment, the disambiguation model 150 may utilize the semantic location parser 170 to parse the utterance for capturing screen location features (e.g., row and column indicators) depending on a screen layout (e.g., on a smaller display screen, such as a smartphone or handheld gaming device, the displayed items may be listed in a single column whereas on a larger display screen, such as a laptop, tablet, desktop computer monitor or television, the displayed items may be listed on a grid structure). Once the location of the words in the parsed utterance has been extracted, the disambiguation model 150 may be utilized to determine the predicted location of a displayed item. From operation 520, the routine 500 then ends.

Figure 6:
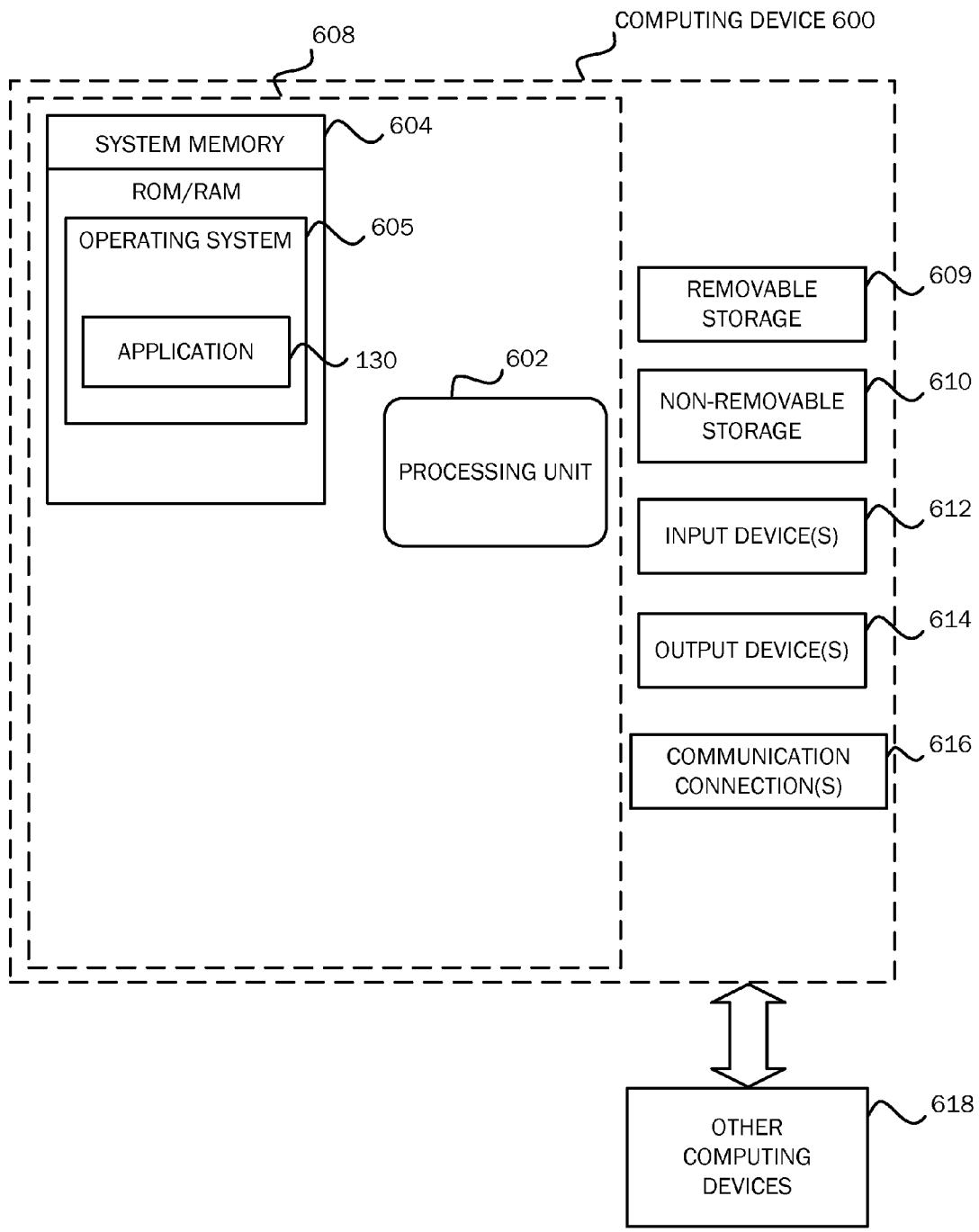
FIG. 6 is a simplified block diagram of a computing device with which various embodiments may be practiced.
Figure 7A:
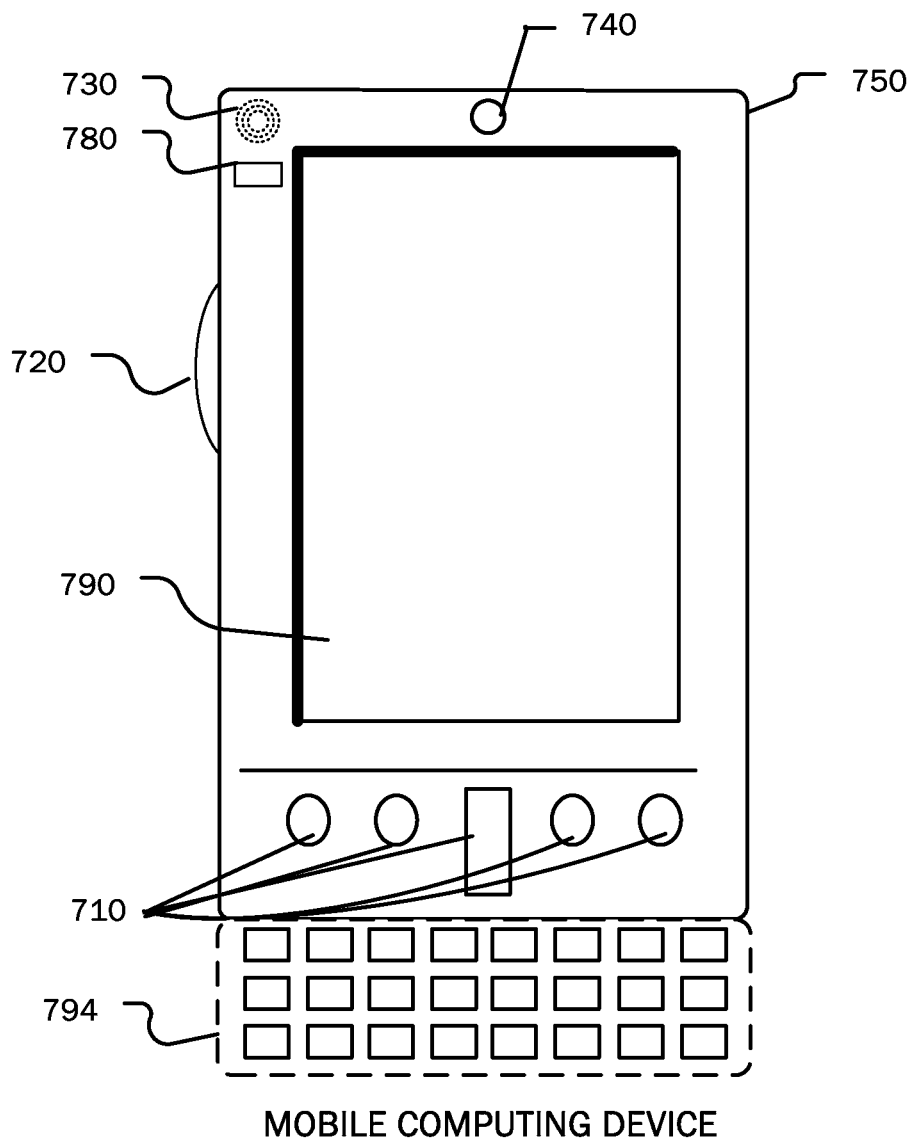
FIG. 7A is a simplified block diagram of a mobile computing device with which various embodiments may be practiced.
Figure 7B:
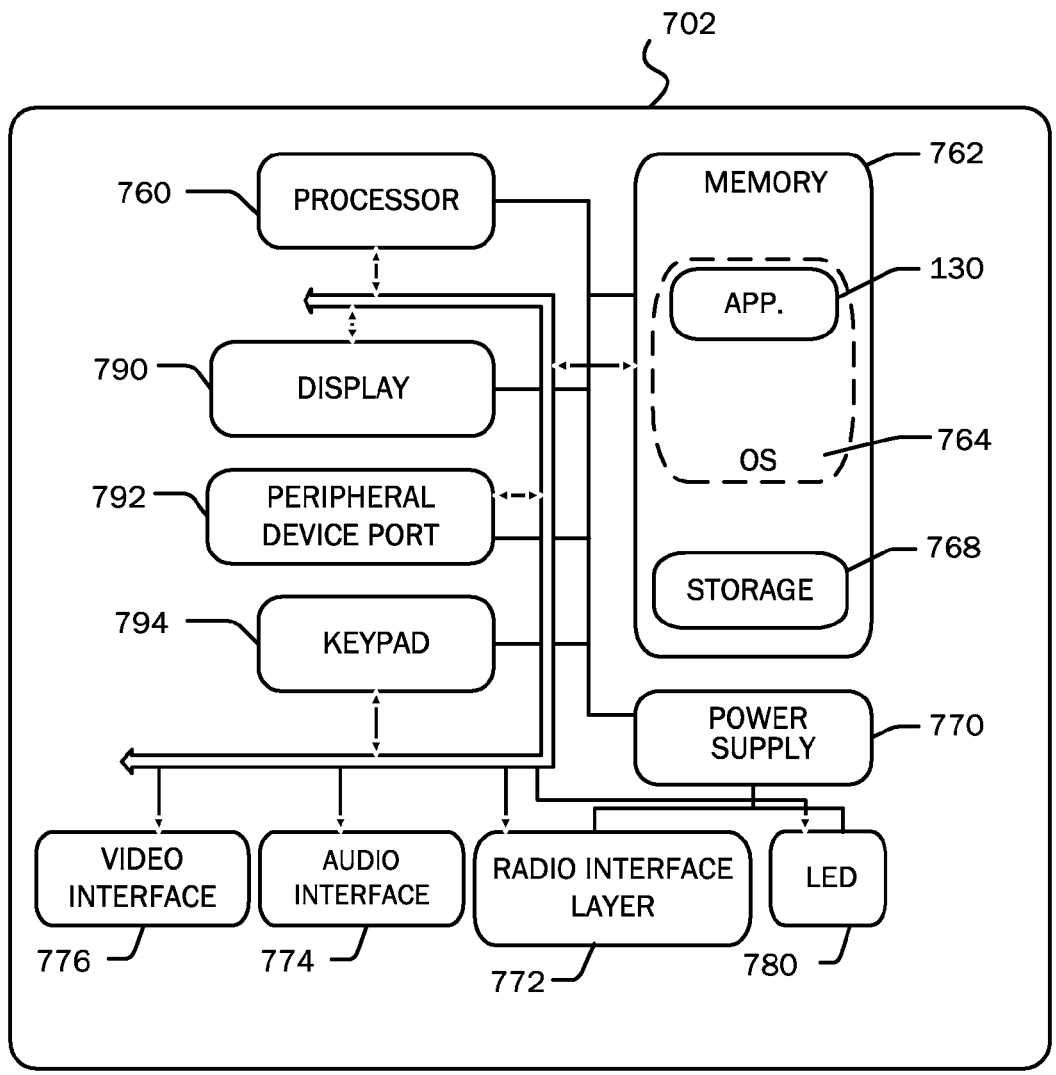
FIG. 7B is a simplified block diagram of a mobile computing device with which various embodiments may be practiced.
Figure 8:
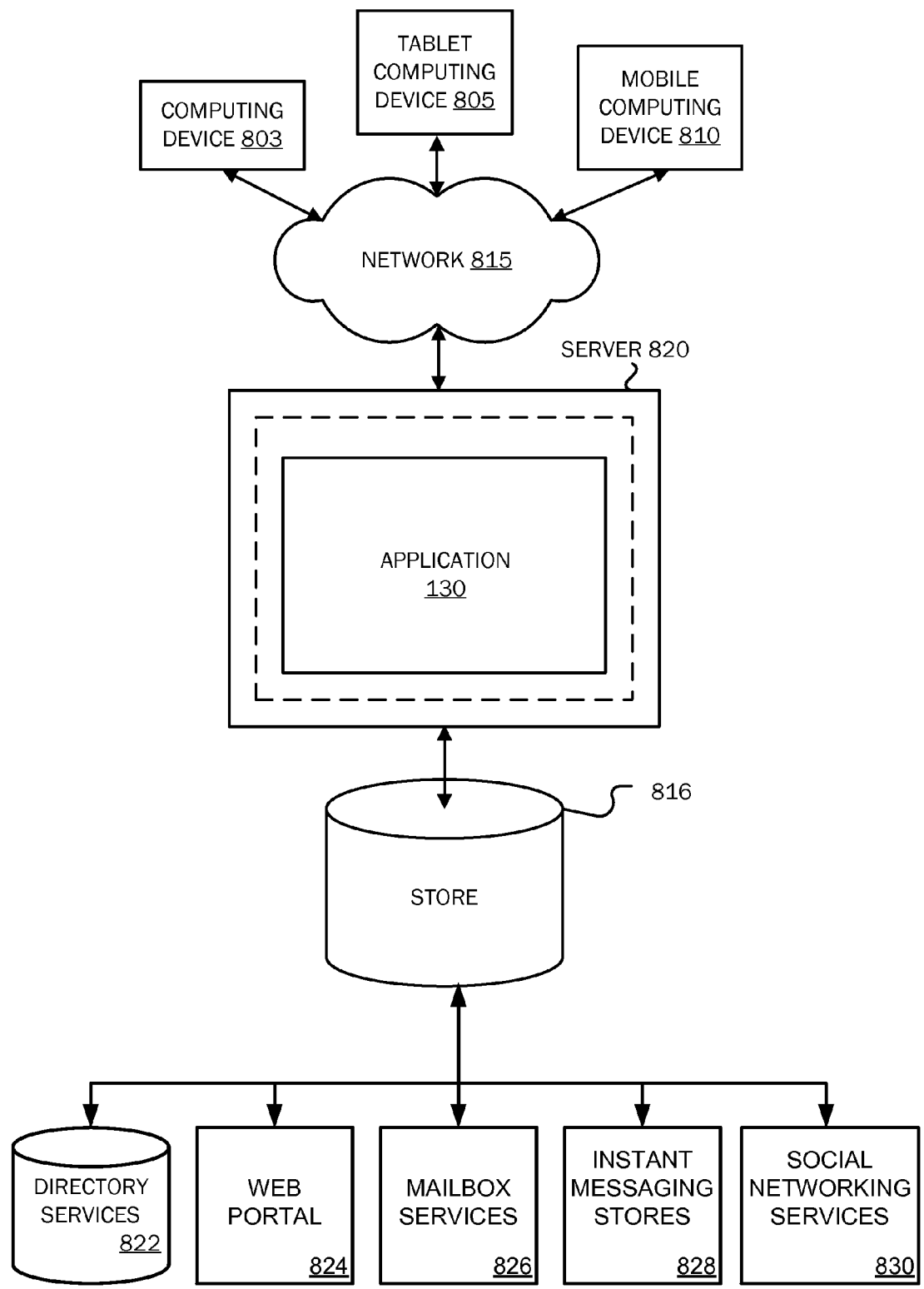
FIG. 8 is a simplified block diagram of a distributed computing system in which various embodiments may be practiced.

FIGS. 6-8 and the associated descriptions provide a discussion of a variety of operating environments in which embodiments of the invention may be practiced. However, the devices and systems illustrated and discussed with respect to FIGS. 6-8 are for purposes of example and illustration and are not limiting of a vast number of computing device configurations that may be utilized for practicing embodiments of the invention, described herein.

FIG. 6 is a block diagram illustrating example physical components of a computing device 600 with which various embodiments may be practiced. In a basic configuration, the computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination. System memory 604 may include an operating system 605 and application 130. Operating system 605, for example, may be suitable for controlling the computing device 600's operation and, in accordance with an embodiment, may comprise the WINDOWS operating systems from MICROSOFT CORPORATION of Redmond, Wash. The application 130 (which, in some embodiments, may be included in the operating system 605) may comprise functionality for performing routines including, for example, utilizing a model based approach for on-screen item selection and disambiguation as described above with respect to the operations in routines 400-500 of FIGS. 4-5.

The computing device 600 may have additional features or functionality. For example, the computing device 600 may also include additional data storage devices (removable and/or non-removable) such as, for example, magnetic disks, optical disks, solid state storage devices ("SSD"), flash memory or tape. Such additional storage is illustrated in FIG. 6 by a removable storage 609 and a non-removable storage 610. The computing device 600 may also have input device(s) 612 such as a keyboard, a mouse, a pen, a sound input device (e.g., a microphone), a touch input device for receiving gestures, an accelerometer or rotational sensor, etc. Output device(s) 614 such as a display, speakers, a printer, etc. may also be included. The aforementioned devices are examples and others may be used. The computing device 600 may include one or more communication connections 616 allowing communications with other computing devices 618. Examples of suitable communication connections 616 include, but are not limited to, RF transmitter, receiver, and/or transceiver circuitry; universal serial bus (USB), parallel, and/or serial ports.

Furthermore, various embodiments may be practiced in an electrical circuit comprising discrete electronic elements, packaged or integrated electronic chips containing logic gates, a circuit utilizing a microprocessor, or on a single chip containing electronic elements or microprocessors. For example, various embodiments may be practiced via a system-on-a-chip ("SOC") where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may operate via application-specific logic integrated with other components of the computing device/system 600 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7A and 7B illustrate a suitable mobile computing environment, for example, a mobile computing device 750 which may include, without limitation, a smartphone, a tablet personal computer, a laptop computer and the like, with which various embodiments may be practiced. With reference to FIG. 7A, an example mobile computing device 750 for implementing the embodiments is illustrated. In a basic configuration, mobile computing device 750 is a handheld computer having both input elements and output elements. Input elements may include touch screen display 725 and input buttons 710 that allow the user to enter information into mobile computing device 750. Mobile computing device 750 may also incorporate an optional side input element 720 allowing further user input. Optional side input element 720 may be a rotary switch, a button, or any other type of manual input element. In alternative embodiments, mobile computing device 750 may incorporate more or less input elements. In yet another alternative embodiment, the mobile computing device is a portable telephone system, such as a cellular phone having display 725 and input buttons 710. Mobile computing device 750 may also include an optional keypad 705. Optional keypad 705 may be a physical keypad or a "soft" keypad generated on the touch screen display.

Mobile computing device 750 incorporates output elements, such as display 725, which can display a graphical user interface (GUI). Other output elements include speaker 730 and LED 780. Additionally, mobile computing device 750 may incorporate a vibration module (not shown), which causes mobile computing device 750 to vibrate to notify the user of an event. In yet another embodiment, mobile computing device 750 may incorporate a headphone jack (not shown) for providing another means of providing output signals.

Although described herein in combination with mobile computing device 750, in alternative embodiments may be used in combination with any number of computer systems, such as in desktop environments, laptop or notebook computer systems, multiprocessor systems, micro-processor based or programmable consumer electronics, network PCs, mini computers, main frame computers and the like. Various embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate the various embodiments described herein.

FIG. 7B is a block diagram illustrating components of a mobile computing device used in one embodiment, such as the mobile computing device 750 shown in FIG. 7A. That is, mobile computing device 750 can incorporate a system 702 to implement some embodiments. For example, system 702 can be used in implementing a "smartphone" that can run one or more applications similar to those of a desktop or notebook computer. In some embodiments, the system 702 is integrated as a computing device, such as an integrated personal digital assistant (PDA) and wireless phone.

Application 130 may be loaded into memory 762 and run on or in association with an operating system 764. The system 702 also includes non-volatile storage 768 within memory the 762. Non-volatile storage 768 may be used to store persistent information that should not be lost if system 702 is powered down. The application 130 may use and store information in the non-volatile storage 768. The application 130, for example, may comprise functionality for performing routines including, for example, utilizing a model based approach for on-screen item selection and disambiguation as described above with respect to the operations in routines 400-500 of FIGS. 4-5.

A synchronization application (not shown) also resides on system 702 and is programmed to interact with a corresponding synchronization application resident on a host computer to keep the information stored in the non-volatile storage 768 synchronized with corresponding information stored at the host computer. As should be appreciated, other applications may also be loaded into the memory 762 and run on the mobile computing device 750.

The system 702 has a power supply 770, which may be implemented as one or more batteries. The power supply 770 might further include an external power source, such as an AC adapter or a powered docking cradle that supplements or recharges the batteries.

The system 702 may also include a radio 772 (i.e., radio interface layer) that performs the function of transmitting and receiving radio frequency communications. The radio 772 facilitates wireless connectivity between the system 702 and the "outside world," via a communications carrier or service provider. Transmissions to and from the radio 772 are conducted under control of OS 764. In other words, communications received by the radio 772 may be disseminated to the application 130 via OS 764, and vice versa.

The radio 772 allows the system 702 to communicate with other computing devices, such as over a network. The radio 772 is one example of communication media. The embodiment of the system 702 is shown with two types of notification output devices: the LED 780 that can be used to provide visual notifications and an audio interface 774 that can be used with speaker 730 to provide audio notifications. These devices may be directly coupled to the power supply 770 so that when activated, they remain on for a duration dictated by the notification mechanism even though processor 760 and other components might shut down for conserving battery power. The LED 780 may be programmed to remain on indefinitely until the user takes action to indicate the powered-on status of the device. The audio interface 774 is used to provide audible signals to and receive audible signals from the user. For example, in addition to being coupled to speaker 730, the audio interface 774 may also be coupled to a microphone (not shown) to receive audible (e.g., voice) input, such as to facilitate a telephone conversation. In accordance with embodiments, the microphone may also serve as an audio sensor to facilitate control of notifications. The system 702 may further include a video interface 776 that enables an operation of on-board camera 740 to record still images, video streams, and the like.

A mobile computing device implementing the system 702 may have additional features or functionality. For example, the device may also include additional data storage devices (removable and/or non-removable) such as, magnetic disks, optical disks, or tape. Such additional storage is illustrated in FIG. 7B by storage 768.

Data/information generated or captured by the mobile computing device 750 and stored via the system 702 may be stored locally on the mobile computing device 750, as described above, or the data may be stored on any number of storage media that may be accessed by the device via the radio 772 or via a wired connection between the mobile computing device 750 and a separate computing device associated with the mobile computing device 750, for example, a server computer in a distributed computing network such as the Internet. As should be appreciated such data/information may be accessed via the mobile computing device 750 via the radio 772 or via a distributed computing network. Similarly, such data/information may be readily transferred between computing devices for storage and use according to well-known data/information transfer and storage means, including electronic mail and collaborative data/information sharing systems.

FIG. 8 is a simplified block diagram of a distributed computing system in which various embodiments may be practiced. The distributed computing system may include number of client devices such as a computing device 803, a tablet computing device 805 and a mobile computing device 810. The client devices 803, 805 and 810 may be in communication with a distributed computing network 815 (e.g., the Internet). A server 820 is in communication with the client devices 803, 805 and 810 over the network 815. The server 820 may store application 130 which may be perform routines including, for example, utilizing a model based approach for on-screen item selection and disambiguation as described above with respect to the operations in routines 400-500 of FIGS. 4-5.

Content developed, interacted with, or edited in association with the application 130 may be stored in different communication channels or other storage types. For example, various documents may be stored using a directory service 822, a web portal 824, a mailbox service 826, an instant messaging store 828, or a social networking site 830.

The application 130 may use any of these types of systems or the like for enabling data utilization, as described herein. The server 820 may provide the proximity application 130 to clients. As one example, the server 820 may be a web server providing the application 130 over the web. The server 820 may provide the application 130 over the web to clients through the network 815. By way of example, the computing device 10 may be implemented as the computing device 803 and embodied in a personal computer, the tablet computing device 805 and/or the mobile computing device 810 (e.g., a smart phone). Any of these embodiments of the computing devices 803, 805 and 810 may obtain content from the store 816.

Various embodiments are described above with reference to block diagrams and/or operational illustrations of methods, systems, and computer program products. The functions/acts noted in the blocks may occur out of the order as shown in any flow diagram. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method comprising:
   storing metadata related to items displayed on a display;
   receiving, by a computing device, an utterance;
   in response to the received utterance, applying, by the computing device, a disambiguation model to the utterance, including:
      identifying whether the utterance is directed to at least one of the plurality of items on the display,
      extracting a plurality of referential features from the utterance, and
      identifying an item among the plurality of items on the display corresponding to the utterance by comparing at least some of the plurality of referential features extracted from the utterance to the metadata; and
   performing, by the computing device, an action associated with the utterance in response to identifying the item corresponding to the utterance.

2. The method of claim 1, wherein identifying whether the utterance is directed to at least one of the plurality of items on the display comprises:
   building a statistical classifier model comprising lexical and semantic features, the lexical and semantic features comprising one or more of the following: a vocabulary obtained from text in the utterance, a phrase match between the utterance and metadata, and locational features; and
   applying the statistical classifier model to the utterance.

3. The method of claim 1, wherein identifying an item among the plurality of items on the display comprises:
   identifying an explicit reference to the item based on a portion of text in the utterance;
   identifying an explicit reference to the item based on a textual cue in the utterance; and
   identifying an explicit reference to the item based on screen location data in the utterance.

4. The method of claim 3, wherein identifying an item among the plurality of items on the display comprises:
   identifying an implicit reference to the item based on the utterance; and
   identifying an implicit reference to a position of the item based on the utterance.

5. The method of claim 4, wherein identifying an item among the plurality of items on the display further comprises:
   determining a plurality of match scores between the utterance and the metadata;
   parsing the utterance for matching phrases between semantic phrases in the utterance and the metadata; and
   parsing the utterance to capture location indicators for predicting a screen location of the item.

6. The method of claim 1, wherein performing, by the computing device, an action associated with the utterance upon identifying the item corresponding to the utterance, comprises:
   selecting the item on the display; and
   displaying additional information about the selected item.

7. The method of claim 1, wherein performing, by the computing device, an action associated with the utterance upon identifying the item corresponding to the utterance, comprises:
   selecting the item on the display; and
   executing an activity associated with the selected item.

8. A computing device comprising:
   a memory for storing executable program code; and
   a processor, functionally coupled to the memory, the processor being responsive to computer-executable instructions contained in the program code and operative to:
      store metadata related to items displayed on a display;
      receive an utterance;
      apply a disambiguation model to the utterance, the disambiguation model being utilized to:
         identify whether the utterance is directed to at least one of the plurality of items on the display,
         extract a plurality of referential features from the utterance, and
         identify an item among the plurality of items on the display corresponding to the utterance by comparing at least some of the plurality of referential features extracted from the utterance to the metadata; and
      perform an action associated with the utterance in response to identifying the item corresponding to the utterance.

9. The computing device of claim 8, wherein the processor, in identifying whether the utterance is directed at least one of the plurality of items on the display, is operative to:
   build a statistical classifier model comprising lexical and semantic features, the lexical and semantic features comprising one or more of the following: a vocabulary obtained from text in the utterance, a phrase match between the utterance and the metadata, and locational features; and
   apply the statistical classifier model to the utterance.

10. The computing device of claim 8, wherein the processor, in identifying an item among the plurality of items on the display, is operative to:
    identify an explicit reference to the item based on a portion of text in the utterance;
    identify an explicit reference to the item based on a textual cue in the utterance; and
    identify an explicit reference to the item based on screen location data in the utterance.

11. The computing device of claim 10, wherein the processor, in identifying an item among the plurality of items on the display, is further operative to:
    identify an implicit reference to the item based on the utterance; and
    identify an implicit reference to a position of the item based on the utterance.

12. The computing device of claim 11, wherein the processor, in identifying an item among the plurality of items on the display, is further operative to:
    determine a plurality of match scores between the utterance and the metadata;
    parse the utterance for matching phrases between semantic phrases in the utterance and the metadata; and parse the utterance to capture location indicators for predicting a screen location of the item.

13. The computing device of claim 8, wherein the processor, in performing an action associated with the utterance upon identifying the item, is operative to:
   select the item on the display; and
   display additional information about the selected item.

14. The computing device of claim 8, wherein the processor, in performing an action associated with the utterance upon identifying the item, is operative to:
   select the item on the display; and
   execute an activity associated with the selected item.

15. A computer-readable storage medium storing computer executable instructions which, when executed by a computer, will cause computer to perform a method comprising:
   receiving a first utterance comprising a query for a plurality of items;
   displaying the plurality of items in response to the first utterance on a display;
   storing metadata related to the plurality of items;
   receiving a second utterance;
   applying a disambiguation model to the second utterance, wherein the applying includes:
      identifying whether the second utterance is directed to at least one item in the plurality of items on the display,
      extracting a plurality of referential features from the second utterance, and
      identifying an item among the plurality of items on the display corresponding to the second utterance by comparing at least some of the plurality of referential features extracted from the second utterance to the metadata and by determining a lexical match between the utterance and the metadata associated with the item; and
   performing, by the computing device, an action associated with the second utterance upon identifying the item corresponding to the second utterance.

16. The computer-readable storage medium of claim 15, wherein identifying whether the second utterance is directed at least one of the plurality of items comprises:
   building a statistical classifier model comprising lexical and semantic features, the lexical and semantic features comprising one or more of the following: a vocabulary obtained from text in the second utterance, a phrase match between the second utterance and the metadata, and locational features; and
   applying the statistical classifier model to the second utterance.

17. The computer-readable storage medium of claim 15, wherein identifying an item among the plurality of items comprises:
   identifying an explicit reference to the item based on a portion of text in the second utterance;
   identifying an explicit reference to the item based on a textual cue in the second utterance; and
   identifying an explicit reference to the item based on screen location data in the second utterance.

18. The computer-readable storage medium of claim 17, wherein identifying an item among the plurality of items further comprises:
   identifying an implicit reference to the item based on the second utterance; and
   identifying an implicit reference to a position of the item based on the second utterance.

19. The computer-readable storage medium of claim 18, wherein identifying an item among the plurality of items further comprises:
   determining a plurality of match scores between the second utterance and the metadata;
   parsing the second utterance for matching phrases between semantic phrases in the second utterance and the metadata; and
   parsing the second utterance to capture location indicators for predicting a screen location of the item.

20. The computer-readable storage medium of claim 15, wherein performing, by the computing device, an action associated with the second utterance, comprises:
   selecting the item on the display;
   displaying additional information about the selected item; and
   executing an activity associated with the selected item.

* * * * *